Patented Jan. 25, 1944

2,339,793

UNITED STATES PATENT OFFICE 2,339,793

METHOD OF TREATING FERRUGINOUS MINERALS CONTAINING OTHER METAL CONSTITUENTS

Olav Moeklebust and Andreas Johan Ravnestad, Fredrikstad, Norway; vested in the Alien Property Custodian No Drawing. Application April 12, 1941, Serial No. 388,276. In Norway November 23, 1940

9 Claims. (Cl. 23—200)

This invention relates to improvements in methods of treating ferruginous materials. More particularly, it relates to a process for treating a ferruginous material which contains, in addition to the iron, other valuable mineral constituents, whereby such other mineral constituents are easily separated from the iron content of the material which itself is recovered as a useful iron oxide product.

An object of the present invention is to provide means for the economical and practical recovery of valuable mineral constituents, other than iron, which may be associated with iron in a ferruginous material. Another object of the invention is to provide simple and effective means for the separation of the iron content of ferruginous materials from the other constituents of the material. A third object of the invention is to recover the iron content of ferruginous materials as useful iron oxide products. These and other objects of the invention will become apparent from this description.

The raw materials to which the invention is applicable are principally those materials, such as ferruginous minerals, in which in addition to the iron content, there are also present other metal constituents, e. g., manganese, copper, aluminum, chromium, vanadium, titanium, columbium, etc. When such materials are treated in accordance with the present invention the metal constituents of the ferruginous material, other than the iron, are obtained as concentrates while the iron content is recovered as useful iron oxide products. It will be understood that the invention is not limited by the nature of the metal constituents other than iron which may be contained in the ferruginous raw material but is applicable generally to such materials.

In our co-pending U. S. application Ser. No. 377,668, filed February 6, 1941; a process for the treatment of ferro-titaniferous materials has been described. We have now discovered that a similar process can be applied to other raw materials containing iron. According to our process it is possible to produce valuable iron oxides from such materials, and also to obtain residues containing valuable metal compounds in a concentrated state.

The present invention contemplates a conversion of the iron compounds in the ferruginous raw material into metallic iron, preferably in a finely divided state, and a subsequent oxidation of such metallic iron to form an oxide of the desired type, and separation of said oxide from other materials present.

The iron-bearing raw material may be ores, such as iron ores used in the steel industry, or an ore concentrate obtained from an ore by any known mechanical, electrical or metallurgical process, or other known processes in ore dressing.

Also "purple ore" or other iron oxides or hydroxides available as by-products from different industries may be used as raw material. If the iron content of the raw material is in the metallic state, preferably finely-divided, it can be directly converted into iron oxides, according to the present invention, without previous reduction.

We prefer to use raw materials which before reduction have been crushed and disintegrated to sandlike fineness. If the raw material contains water, acids, undesirable organic matters, sulphur or other matter which can be removed by roasting or calcination, it will generally be advisable to subject the material to such roasting or calcination before it is used in our process.

In the reduction operation reducing agents may be used, such as those commonly employed for reduction of iron ores, for instance, coal, coke, charcoal, or reducing gases containing carbon monoxide, hydrogen, and the like. The temperature required for the reduction is dependent upon the reducing material employed. When using coal or coke or other solid carbonaceous materials, the temperature required for conversion of practically the whole of the iron content to metallic state has been found to be about 1000° C. When using gases for reduction, a somewhat lower temperature may be used with a similar effect, for instance, a temperature of 800°–900° C.

The reduction operation may be carried out by passing the charge of ferruginous material to be treated according to the invention through a rotary kiln heated by any suitable means, but stationary retorts may also be used. Reduction in rotary kilns gives a continuous and uniform operation, and this type of apparatus is therefore preferred. It is important that the charge which comes from the kiln after the reducing treatment be cooled under such conditions that reoxidation is prevented, and the reduced material should not undergo any changes which render it less reactive in the subsequent oxidation process.

When using a solid reducing agent, like coke or charcoal, it is advisable to have enough of the reducing agent in the charge so that an excess will remain in the finished reduced charge. It has been found that such excess of reducing agent can be easily removed from the cooled charge by mechanical means, for instance, by washing with water or by magnetic separation. An effective cooling is obtained by quenching the reduced material in cold water.

To what extent the iron content of the ferruginous material should be reduced to metallic state, is dependent upon the quality of the raw material. In general it is desired to reduce as much iron to metallic state as can be easily attained in an economical way, and it is seldom advisable to reduce more than 95% of the iron to the metallic state inasmuch as the reduction of the iron above this limit requires a comparatively long time.

Having obtained a reduced material with the desired metallic iron content, the excess reducing agent is removed by washing, or by other suitable means. Also gangue, ashes or other impurities may be removed before oxidation by washing or other means.

The reduced material is now subjected to a treatment in order to oxidize the iron. The oxidation is carried out under such conditions that the iron oxides formed may be easily separated from the residual constituents of the ferruginous material and are of a uniform, soft texture. The conditions which permit the attainment of the iron oxides in this form, constitute an important feature of our invention.

The oxidation of the iron is carried out at a relatively low temperature, preferably below 100° C., air and water being admitted and in some cases also steam. Temperatures of about 120° C. up to about 200° C. have also been used with success. The admission of air, water or possibly steam is carried out under strictly controlled conditions in order to keep the temperature of the charge at the desired point, for instance, between 40° and 90° C.

The oxidation of the metallic iron to iron oxides is a strongly exothermic reaction. Because of the heat of oxidation the temperature of the material will generally rise, but steam or hot gases may be admitted to hasten the reaction. Water will usually have to be introduced in order to maintain the desired temperatures, the water evaporated balancing the heat developed by the oxidation.

It has been found that a certain amount of water in the charge promotes the oxidation velocity, and effects the formation of iron oxides of a type which can be subsequently easily separated from the residue by mechanical means.

The condition of the charge during oxidation may be characterized as semi-dry or slightly wet. The amount of water necessary to obtain this state varies for each kind of ore, depending upon the wetability of the material. For most of the materials an amount up to 20% of the weight of the reduced material has proved sufficient at the beginning of the oxidation process. In some cases 6–10% of water has given the best results. Certain factors, such as particle size, degree of reduction, quality of ore, etc., play an important part in the adjustment of the most favourable water addition, and it is therefore difficult to give more exact figures.

In order to keep the mass in the desired wet condition during the oxidation, water is added to replace the water evaporated in addition to the water absorbed by the iron oxides formed.

It will be understood that the use of steam during oxidation will particularly come into question when more heat is lost by evaporation, radiation, and conduction than generated by the exothermic reaction. It will, however, in many cases be an advantage to start the oxidation by admission of steam.

If the oxidation is carried out at temperatures above 200° C., the iron oxides formed will usually be hard and not easily removable from the residue. The iron oxides formed at higher temperatures, i. e., temperatures above 200° C., have different appearance than the oxides formed at lower temperatures, i. e., temperatures below 200° C.

The oxidation operation may be carried out in stationary or rotary apparatus. It has been found that rotary drums are well suited for the oxidation process, as in such apparatus a continuous operation is possible, and the admission of water, air and steam is easily effected and controlled. It will be understood that in such apparatus the oxidizing gases thoroughly contact the material to be treated.

The oxidation may be carried out in one or more steps dependent upon the material and the apparatus used. When using rotary drums, or apparatus of the type of a Wedge furnace for the oxidation, the operation is generally carried out in a single step.

Experiments have proved that the oxidation of the iron may be accelerated by using additions of electrolytes, as $NaCl$, $NH_4Cl$, $MgCl_2$, $CuCl_2$, $HCl$, $FeCl_3$. Also the presence of $CO_2$ or $CO_2$-containing gases accelerates the oxidation of the metallic iron to a considerable extent.

When the oxidation has been completed, the charge is subjected to a treatment in order to separate the iron oxides from the residue. As the soft iron oxides at this stage exist in mechanical mixture with the coarser residue and are not chemically combined therewith, the separation may be effected by subjecting the charge to vigorous agitation in water or by some sort of motion which causes the particles to rub or grind against each other. This operation may be carried out in rotary drums, ore classifiers, or other suitable apparatus. By a treatment in which water is used the iron oxides are suspended in the water and may be separated from the residue by washing and decantation.

The iron oxides suspended in water will easily settle when allowed to stand in settling tanks, and may also be filtered in filter presses or other filtration apparatus, preferably after having been thickened in settling tanks.

The further treatment of the filtered or dewatered iron oxide product will depend on the particular commercial application of same.

The separation of the iron oxides from the residue may also be effected by other means than that described, for instance, by electro-magnetic treatment, wet flotation, electro-flotation, air-separation, such as elutriation, or other means in which advantage is taken of the different physical properties of the iron oxides and the residue. The iron oxides thus obtained are black and strongly magnetic.

The iron oxide product may be used in the preparation of iron oxide pigments. When dried at low temperatures and subsequently disintegrated, it forms an excellent black iron oxide pigment. The chemical composition appears to be close to $Fe_3O_4$ with some combined water, or it may be practically anhydrous if the drying temperature has been sufficiently high. The products are of even, uniform structure and of soft texture, the colour being deep black and the tinting strength and hiding power very good, compared with other black inorganic pigments. They also show a low content of water soluble matter and a practically neutral reaction when tested for pH. The products may be used with advantage in paints, lacquers, enamels, printing ink and for similar purposes. It has been found that paint films, pigmented with our products, show excellent drying properties, and the dry film may be obtained with high gloss, if desired.

The oxidation process may also be carried out in such a way that the iron oxide products take on a more or less distinct brownish tone, probably due to a further oxidation of some of the material to $Fe_2O_3$. In this case the tinting strength is considerably increased. Oxides with more or less distinct brown, yellow or red shades may be obtained, especially when oxidizing a charge in which the quantity of metallic iron is comparatively low, and the oxidation is allowed to proceed to products of the type $Fe_2O_3$ In the event the charge is not stirred sufficiently, the yellow or red shades also appear on the surface of the mass. The colour and tone of the iron oxides are influenced by many factors during preparation, such as pH, content of water, addition of catalysts, etc.

The iron oxides may also be calcined at higher temperatures, for instance, at 400°–1000° C., preferably under oxidizing conditions in order to obtain iron oxides of different shades and properties.

The iron oxide pigments obtained may be disintegrated or pulverized according to the fineness desired. Air-separation, wet-milling with or without dispersion and classification, elutriation or other means for obtaining even and uniform products may be employed.

Furthermore, in synthetic products of different kinds like linoleum, rubber products and the like our iron oxides are useful as fillers or pigments or both. Magnetite electrodes may also be made of our product.

The iron oxide products of the present invention are also very useful as raw materials in the iron and steel industry due to their high purity and particularly because of the absence of phosphorus and sulphur. When dried or calcined, the iron oxides are obtained in lumps, which can be transported in bulk without further treatment. In some cases it is preferred to briquet or sinter the oxides.

It will be understood that our process may find application in the iron and steel industry for the utilization of iron ores of different origin thus making it possible to extract iron from such ores in the form of high grade iron oxides free from undesirable impurities. Ores with a low iron content and other iron ores which are inferior on account of their content of impurities may thus be utilized.

In general our process may be applied to iron-containing ores which by the reduction yield metallic iron and a residue which after the subsequent oxidation is separable from the iron oxide formed.

When the raw material contains valuable metals besides iron, concentrates of these metals are contained in the residue. Such residues may easily be freed from gangue and other impurities by mechanical means. Concentrates of metals such as manganese, copper, chromium aluminium, vanadium, titanium, columbium, have been obtained according to the invention.

By means of the present invention as applied to manganese-iron oxide materials the iron is converted into metallic state, whereas the manganese remains as an oxide. The reduced material may be freed from undesired impurities by washing whereafter it is subjected to an oxidation treatment in a similar manner as described for other iron containing ores. The metallic iron is converted an iron oxide and is separated from the coarser manganese concentrate which is left practically unattacked.

In general the oxidation of the metallic iron should be prolonged until only a few per cents, say, 1–3% of metallic iron, remains in the oxidized and washed residue, but in some cases, for instance, when the manganese concentrate is to be used for preparation of ferro-manganese, it may be an advantage to leave a considerable amount of metallic iron in the concentrate.

The residue containing the manganese oxides may be freed from undesired impurities by mechanical means, for instance, shaking tables, by magnetic treatment, or flotation, in order to obtain a manganese concentrate in a comparatively pure state.

Copper often occurs together with iron in chalco-pyrite, bornite, and in copper containing pyrites and similar minerals.

In such minerals the copper as well as iron are usually present as sulphides. Before subjecting the copper-iron ore to the combined reducing and oxidizing operation according to the present invention, the ore is usually roasted in order to remove sulphur. During this roasting the iron is converted into oxides. In some cases it is an advantage to roast the ore at sufficient temperature to sinter the copper. The reduction may thus be carried out as described above.

The reduced material is freed from any excess reducing agent, and the reduced ore may then be subjected to a mechanical treatment by which silicates, gangue and other compounds are separated from the copper-iron concentrate.

The oxidation of the copper-iron material and the separation therefrom of the iron oxides formed are carried out in practically the same manner as described for other iron ores.

Below are given some practical examples of the invention:

*Example 1*

A low grade iron ore was mixed with coal and heated under reducing conditions at 950°–1000° C. in a rotary kiln. After reduction the product contained 57% metallic iron. The discharge was quenched in water.

The reduced material was transferred to a tank and washed in a continuous flow of water, whereby surplus of coke, ashes and a part of the gangue were removed.

The reduced ore was then dewatered by filtration and taken to a rotary drum for oxidation of the metallic iron.

The drum was rotated and air introduced, whereby the temperature of the charge rose to about 60° C. At this temperature a rapid oxidation was taking place. During the operation the charge was kept in a semi-dry or slightly wet condition at about 70° C. by addition of water, and the rotation continued until practically all the metallic iron had been oxidized.

The charge was then transferred to another rotary drum, where the iron oxide was brought into suspension by washing with water. The overflow from the drum was pumped to a settling tank. After settling the iron oxide pulp was filtered, washed and discharged as a thick cake.

The filter cake was dried at 60° C. and a magnetic product in the form of a soft, uniform powder with deep black colour was obtained.

Example 2

Purple ore obtained by roasting pyrites was reduced at 950°–1000° C. by means of coke in a rotary kiln. The reduced material contained 75% of metallic iron. The reduced product was oxidized as described in Example 1. In this case a small amount of magnesium chloride ($MgCl_2$) was added in order to activate the surface of the metallic iron and accelerate the oxidation. The temperature during oxidation was 60°–90° C. A sample of the mass taken after an oxidation period of 4 hours showed that about 65% of the iron had been converted into iron oxides. By means of further oxidation practically all the metallic iron was converted into iron oxide, which was treated as in Example 1.

Example 3

A manganese ore containing 9.1% Mn and 28.1% Fe was mixed with coal and reduced at 950°–1000° C. in a rotary kiln. By means of this reduction 82% of the iron in the ore had been converted to the metallic state. The discharge was quenched in water.

The reduced material was stirred with water, and after removal of the excess carbon, dewatered and taken to a rotary drum for oxidation. A small amount of hydrochloric acid was added to accelerate the oxidation.

The charge was kept in motion and air and steam admitted until the charge reached a temperature of about 50° C. The charge was then treated as described in Example 1, and after 6 hours' oxidation more than 90% of the iron had been converted into iron oxides.

An analysis of the manganese concentrate showed that 80% of the iron content of the original ore had been removed, and the content of manganese had increased correspondingly. The separated iron oxide contained less than 0.5% Mn.

Example 4

A copper-iron sulphide ore which contained 18% Cu, was roasted until the sulphur was nearly completely removed, and reduced until about 90% of the iron in the ore had been converted to the metallic state. The reduced product contained 42.5% metallic iron. The discharge was quenched in water.

The oxidation was carried out as described in Example 1. Because of the heat of oxidation the temperature rose to 90° C. without any admission of steam. The charge was kept between 60° and 90° C. during oxidation by small addition of water, which at the same time kept the mass at practically constant moisture content. The charge was treated as described in Example 1.

The foregoing examples have illustrated the present invention as applied to a low grade iron ore, purple ore obtained by roasting pyrites, a ferro-manganese ore and a copper-iron sulphide ore. It will be understood that the invention and the appended claims are in no way to be limited thereto. As will be understood from this description of the process of our invention it is equally applicable to ferruginous materials generally and its novelty resides not in the type of material to which it applies but in the method itself.

We claim:

1. Method for the treatment of ferruginous minerals containing other metal constituents which comprises calcining a finely divided ferruginous mineral under reducing conditions until a major portion of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation between about 40° C. and about 200° C., and separating the resulting iron oxides from the residue containing the metal constituents of the mineral other than the iron.

2. Method for the treatment of ferruginous minerals containing other metal constituents which comprises calcining at temperatures between about 800° C. and about 1000° C. a finely divided ferruginous mineral in contact with a reducing agent until from about 50 percent to about 95 percent of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, controlling the resulting exothermic oxidation by regulation of the supply of oxidizing gas so that the temperature of the wet mass does not exceed about 200° C., and separating the resulting iron oxides from the residue containing the metal constituents of the ore other than the iron.

3. Method for the treatment of a copper-containing ferruginous mineral which comprises calcining said mineral in a finely-divided state under reducing conditions until a major portion of the iron content of the mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation between about 40° C. and about 200° C., and separating the resulting iron oxides from the residue containing the copper constituent of the said mineral.

4. Method for the treatment of a manganese-containing ferruginous mineral which comprises calcining said mineral in a finely-divided state under reducing conditions until a major portion of the iron content of the mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation between about 40° C. and about 200° C., and separating the resulting iron oxides from the residue containing the manganese constitutent of the said mineral.

5. Method for the treatment of a chromium-containing ferruginous mineral which comprises calcining said mineral in a finely-divided state under reducing conditions until a major portion of the iron content of the mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation between about 40° C. and about 200° C., and separating the resulting iron oxides from the residue containing the chromium constituent of the said mineral.

6. Method for the treatment of ferruginous minerals containing other metal constituents which comprises calcining a finely-divided ferruginous mineral under reducing conditions until a major portion of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation between about 40° C. and about 200° C., and separating the resulting iron oxides from the residue containing the metal constituents of the mineral other than the iron by hydro-separation.

7. Method for the treatment of ferruginous mineral containing other metal constituents which comprises calcining a finely-divided ferruginous mineral under reducing conditions until a major portion of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, maintaining the temperature of the wet mass during the oxidation between about 40° C. and about 200° C., and separating the resulting iron oxides from the residue containing the metal constituents of the mineral other than the iron by air-separation.

8. Method for the treatment of ferruginous minerals containing other metal constituents which comprises calcining at temperatures between about 800° C. and about 1000° C. a finely-divided ferruginous mineral in contact with a reducing agent until from about 50 percent to about 95 percent of the iron content of said mineral is converted to metallic iron, cooling the reduced mineral under non-oxidizing conditions, admixing the reduced mineral with sufficient water to form a wet mass having a temperature not in excess of 200° C., exposing said wet mass to the action of an oxidizing gas to oxidize the metallic iron content of the reduced mineral to iron oxides, controlling the resulting exothermic oxidation by regulation of the supply of oxidizing gas so that the temperature of the wet mass does not exceed about 200° C., suspending the oxidized mass in water, agitating the suspension to disengage the iron oxide particles from unoxidized particles, removing the water containing the lighter iron oxide particles from the heavier unoxidized residual particles containing the metal constituents of the mineral other than the iron.

9. The process of treating ferruginous minerals containing other metal constituents which comprises a thermal reduction of iron oxides to metallic state and a subsequent oxidation of the iron at a temperature below 200° C. by means of atmospheric oxygen in combination with water or steam or both, and removal of iron oxides by agitation with water and separation of the suspended iron oxides from the residue containing the metal constituents of the mineral other than the iron.

OLAV MOEKLEBUST.
ANDREAS JOHAN RAVNESTAD.